United States Patent [19]

Harris

[11] E Re. 29,029

[45] Reissued Nov. 9, 1976

[54] ADJUSTABLE BED FRAME MEMBER

[75] Inventor: Allan E. Harris, Chicago, Ill.

[73] Assignee: Harris-Hub Co., Inc., Harvey, Ill.

[22] Filed: Apr. 15, 1974

[21] Appl. No.: 460,910

Related U.S. Patent Documents

Reissue of:

[64] Patent No.: 3,744,068
Issued: July 10, 1973
Appl. No.: 232,475
Filed: Mar. 7, 1972

[52] U.S. Cl. ..... 5/181; 5/184; 5/202; 248/408

[51] Int. Cl.[2] ..... A47C 19/00

[58] Field of Search ..... 5/181, 185, 187, 200, 5/201, 285

[56] References Cited

UNITED STATES PATENTS

| | | | |
|---|---|---|---|
| 2,544,274 | 3/1951 | Moeller | 5/185 |
| 2,567,619 | 9/1951 | Rosenfeld | 5/285 |
| 3,100,304 | 8/1963 | Brandlin et al. | 5/181 |
| 3,646,623 | 3/1972 | Harris | 5/181 |

FOREIGN PATENTS OR APPLICATIONS

| | | | |
|---|---|---|---|
| 972,062 | 5/1959 | Germany | 248/408 |

*Primary Examiner*—Casmir A. Nunberg
*Attorney, Agent, or Firm*—Dressler, Goldsmith, Clement & Gordon, Ltd.

[57] ABSTRACT

An improved adjustable cross frame member for use in a bed frame having side frame members and another such cross frame member. The improved member is comprised of first and second elongate L-shaped elements having mutually perpendicular legs. Both elongate elements are provided with a plurality of longitudinally spaced slots and protruding fingers in one leg thereof, with the spacing between slots and fingers and their sizes being alike for both elongate elements. The fingers of each element are oriented to be inserted into respective slots of the opposite element which are complementary therewith when the elements are initially positioned with like legs in face abutting engagement. The elongate elements are then longitudinally moved relative to each other to position each inserted finger in overlapping engagement with the portion of the opposite element adjacent the slot in which the fingers are initially inserted, and thereby positively hold the elements against separation. In order to lock the elements longitudinally in this position, one of the elements includes position defining apertures associated with each of the slots, and the other element includes a releasable resilient member having a detent which engages a position defining aperture when the fingers are moved in overlapping engagement with the elements.

14 Claims, 4 Drawing Figures

ADJUSTABLE BED FRAME MEMBER

Matter enclosed in heavy brackets [ ] appears in the original patent but forms no part of this reissue specification; matter printed in italics indicates the additions made by reissue.

BACKGROUND OF THE INVENTION

This invention relates generally to bed frames of the knock-down type and in particular, to frame members comprised of two elements to be fastened together. As detailed in the related commonly assigned, co-pending application of A. E. Harris and W. E. Behnke on "Improved Bed Frame Assembly," Ser. No. 34,061, filed May 4, 1970, a problem has long existed in the art because conventional frame members of the above type have not provided positive interlocking engagement between cross frame elements, and have required the use of a large number of fasteners, making it time consuming to [ assembly ] *assemble* and disassemble the bed frame assembly. Furthermore, with the advent of "king-size" and "queen-size" bedding, bed frame vendors have found it necessary to stock undesirably large inventories of bed frame assemblies of a given size, because of the complete lack of an easily manipulable and reliable means for adjusting the width of the bed frame assembly. The invention of the copending application has solved such problems quite well, and has met with a very considerable degree of commercial success in so doing.

In order to further accommodate the quite evident demand for bed frame members responsive to the above problems, it has also become desirable to furnish an adjustable bed frame member having the advantages of the co-pending invention yet at the same time having a lower cost and having an even more simplified construction.

SUMMARY OF THE INVENTION

Accordingly, the bed frame member of the present invention also solves the problems encountered in the prior art by providing a secure but readily releasable interlocking relationship between further bed frame members, which allows the bed frame to be quickly and easily assembled to one of a pluraity of desired sizes. The frame member of the present invention may be adjusted to a compact length for shipment and storage, and then quickly and easily readjusted when the bed frame is assembled.

The improved adjustable bed frame member of the present invention is adapted to be fastened transversely between a pair of horizontally disposed further bed frame members, so as to hold such further frame members in spaced parallel relationship. The improved member includes a first elongate L-shaped element adapted at one end to be fastened to one of the pair of further bed frame members, and comprised of first and second mutually perpendicular flat legs. The first leg is provided with a first finger protruding therefrom at the end opposite the end adapted for attachment to the further bed frame member. This finger has a first generally transversely extending portion and a second elongated portion spaced from the first leg and extending generally parallel to the first leg. The first leg also includes a plurality of longitudinally spaced and longitudinally elongate slots.

The improved adjustable member also comprises a second elongate L-shaped element adapted at one end to be fastened to the other of the pair of further frame members and comprised of first and second mutually perpendicular flat legs. The first leg of this second element is provided with a second finger protruding therefrom at the end opposite the end adapted for fastening to the other of a pair of further frame members. This second finger has a first generally transversely extending portion in a direction opposite to that of the first portion of the first finger, and a second elongated portion spaced from its first leg and extending generally parallel to the first leg of the second element. The second element also includes a plurality of longitudinally spaced and longitudinally elongated slots that are spaced from each other, and from the second finger, by dimensions corresponding to the spacing of the same elements of the first elongate element.

Both first and second fingers are similar in transverse width to the elongated slots and somewhat smaller in longitudinal length than those slots. Each of the fingers is adapted for respective insertion through one of the elongated slots of the other element when like legs of the elongate elements are positioned in face abutting engagement with one another, with the space between each of the elongated finger portions and their respective legs allowing the elongated finger portions to clear the adjacent leg of the other element. When the first and second elongate elements are moved longitudinally relative to one another, the elongated finger portions of each elongate element are caused to overlap and engage the portion of the first leg of the other elongate element adjacent the slot in which the fingers are initially inserted. The first and second elongate elements are then positively held against separation in a length adjustment corresponding to the longitudinal position of the selected slots.

In order to longitudinally lock the elements in the selected position of adjustment, the improved adjustable member further includes means for retaining the first and second elongated elements in the selected position of adjustment. This means includes a plurality of longitudinally spaced position-defining apertures in the first leg of one of the elongate elements, with one of such position-defining apertures being associated with each slot on the one edge elongate element and the complementary slot on the other elongate element. The retaining means further includes a releasable locking member at a fixed location on the first leg of the other of the elongate elements, with that other elongate element being provided with a single lock access aperture at such fixed location. The locking member is a thin, flat elongated, inherently resilient member connected at one end to the first leg of the other elongate element and passing over the access aperture. The resilient member has a detent portion at the access aperture adapted to pass therethrough and engage within one of the position-defining apertures as the elongate elements are moved longitudinally relative to one another. The resilient member also has a manually graspable portion for withdrawing the member against its resilient bias, as for example, when the bed frame is initially assembled from the compact shipping position, or when it is desired to readjust the frame to accommodate different size bedding. The access aperture is spaced from the selected one of the position-defining apertures when the fingers are initially inserted in the slots associated with the selected position-defining aperture, but the access aperture is positioned in registry with the selected position-defining aperture when the elongate elements are moved longitudinally relative to one another to cause the fingers to engage the first leg of the other elongate element. Thus the detent is automatically moved into engagement with the selected position-defining aperture to lock the first and second elongate elements in positively held-together relationship position of adjustment until the locking member is released by withdrawing the detent from the selected position defining aperture through manipulation of the manually graspable portion.

The fingers may not only be positioned on different elements extending longitudinally in opposite directions, but also both fingers may be positioned at spaced locations on a single element and with both fingers extending longitudinally in the same sense, and with corresponding pairs of slots on the other of the elements to receive them.

Furthermore, instead of having a unitary locking member, a pin may be associated with a thin, flat resilient member, with the pin extending through the resilient member on either side to provide the manually graspable portion at one end thereof and the detent portion at the other end thereof.

The above described adjustable frame member is extremely inexpensive. The elongate L-shaped elements may be provided by conventional commercially available angle iron stock, and the fingers fabricated by stamping from such stock. The locking member may be fabricated from a short length of common commercially available spring steel, so that all of the desirable advantages of an adjustable frame member as described in the above mentioned application are provided with minimum number of relatively inexpensive parts which results in a significant reduction in cost.

DETAILED DESCRIPTION

Figures 1, 2, 3, 4:
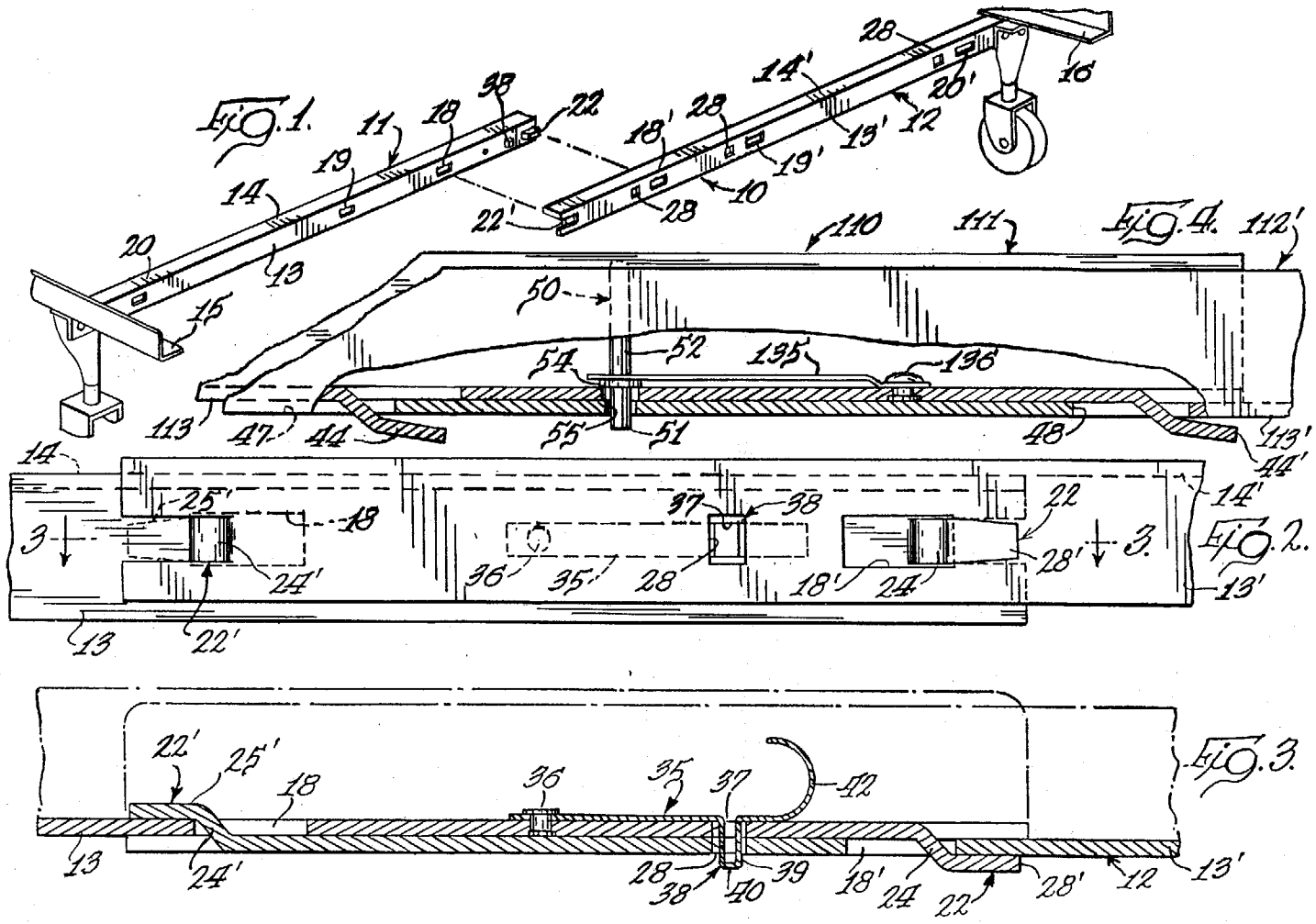
FIG. 1 is an exploded view of a preferred embodiment of the improved bed frame member of the present invention.
FIG. 2 is an enlarged front elevational view of the improved member with its elements locked in a selected position of adjustment.
FIG. 3 is a plan view, partly in cross-section, along line 3—3 of FIG. 2, of the structure of FIG. 2.
FIG. 4 is a plan view, partly in cross-section, of a modified bed frame member.

While this invention is susceptible of embodiment in many different forms, there is shown in the drawings and will herein be described in detail a preferred embodiment of the invention, and a modification thereof, with the understanding that the present disclosure is to be considered as an exemplification of the principles of the invention and is not intended to limit the invention to the embodiments illustrated. The scope of the invention will be pointed out in the appended claims.

Referring now to the drawings, FIG. 1 shows a first embodiment of the improved adjustable cross frame member 10, which is comprised of L-shaped elongated elements 11 and 12, with element 11 including first and second mutually perpendicular legs 13 and 14 of similar transverse width, and with element 12 including first and second mutually perpendicular legs 13' and 14' of similar transverse width. Both elements 11 and 12 are respectively fastened at one end to side frame members 15 and 16, and are positioned so that both leg portions 13 and 13' are vertically oriented and both leg portions 14 and 14' extend outwardly horizontally from the upper edges of legs 13 and 13', respectively, and in the same sense. As is well understood in the art, cross frame member 10 cooperates with an additional identically constructed cross frame member (not shown) spaced therefrom and parallel therewith to form a bed frame, in combination with side frame members 15 and 16. Elements 11 and 12 may be formed of commercially available angle iron stock, and hence are relatively inexpensive.

Element 11 is provided with a plurality of longitudinally spaced, elongated, generally rectangular slots 18, 19 and 20, as well as a finger 22 protruding from the end of the element opposite the end fastened to further frame member 15. The slots and finger lie along a common line in vertical leg 13 generally medially of the leg. Slot 18 corresponds to the widest position of adjustment of member 10, while slot 19 corresponds to the medial position of adjustment, with slot 20 corresponding to the narrowest position of adjustment. These positions relate to bedding of King, Queen and regular size, respectively.

Likewise, element 12 is provided with a plurality of longitudinally spaced, elongated, generally rectangular slots 18', 19' and 20', as well as a finger 22' protruding from the end of the element 12 in the opposite sense from finger 22, with the slots and finger lying along a common line in vertical 13' generally medially of the leg. As may best be seen in FIG. 3, both fingers 22 and 22' have first generally transverse portions 24 and 24' extending respectively outwardly and inwardly at an angle from legs 13 and 13', and second elongated portions 25 and 25' extending parallel to their respective legs 13 and 13'. Such transverse and elongated portions of each finger are integral with each other and with their respective legs 13 and 13' and may be formed by stamping methods which depress a rectangular portion of the legs 13 and 13' from the plane thereof.

Element 12 is further provided with a plurality of position defining apertures 28 of generally rectangular cross section in leg 13'. Each of the slots 18, 19 and 20 has associated with it one of such apertures, and in the illustrated embodiment the aperture is positioned on the side of each slot 18–20 nearest finger 22, although it should be recognized that the apertures 28 may also be positioned elsewhere.

For both of the fingers 22 and 22', the spacing of the slots from the fingers and the spacing of the slots from each other is the same, as are the dimensions of both the slots and the fingers. Both fingers are similar in transverse width to each of the slots and somewhat smaller in their longitudinal length than the slots. However, neither the slots nor the fingers need necessarily be of rectangular configuration; a semi-circular configuration, for example, could also serve; but in any case, the fingers must be insertable through their corresponding slots, and the transverse spacing from their respective leg of the elongated portions of the fingers which are parallel to the leg must be at least as great as the thickness of the slotted leg of the other elongate element.

Located on the side of leg 13 of element 11 opposite that of finger 22 is an elongated, thin, generally flat and inherently resilient locking member 35 which may best be seen in FIG. 3. It is secured to leg 13 by fastener 36 so as to normally lie flat against the leg's surface and extend longitudinally generally parallel with leg 13. Leg 13 of element 11 is further provided with a single lock access aperture 37 at a location between finger 22 and slot 18. The resilient locking member 35, which may be of spring metal, such as common spring steel, extends longitudinally over the access aperture 37 and incorporates a detent portion 38 comprised of an outwardly bent section 39 that extends through access aperture 37 and which has a flattened end portion 40. At the end of the resilient member 35 opposite fastener 36, a manually graspable portion 42 is comprised of yet another bent section extending from such end in a semi-circle away from leg 13. The locking member 35 applies a bias to detent 38, urging it through aperture 37 to normally protrude beyond leg 13, detent 38 being of a height at least equal to the combined thicknesses of legs 13 and 13' of the elements 11 and 12. By grasping portions 42 and pulling member 35 against the inherent bias thereof, detent 38 may be withdrawn from within leg 13 of element 11 to enable longitudinal movement of elements 11 and 12 as will be understood readily.

Assembly of the elements 11 and 12 is carried out by bringing together the like corresponding legs of the elements into face abutting engagement so that the finger 22' is initially inserted through one of the slots 18, 19 or 20, and finger 22 is initially inserted into one of the slots 18', 19' or 20'. Positioning of the fingers respectively at slots 18 and 18' corresponds to selection of the longest length adjustment of member 10, while selection of slots 19 and 19' yields a some-what shorter length, and slots 20 and 20' a substantially shorter length.

With the initial insertion of fingers 22 and 22' into any of the just designated slot pairs to obtain the desired corresponding length adjustment, the end 40 of detent 38 engages the adjacent wall of leg 13' and locking member 35 is flexed outwardly relative to leg 13. In order to cause the elements 11 and 12 to be held against separation, the elements 11 and 12 are moved longitudinally with respect to each other to thereby move the elongated finger portions 25 and 25' into overlapping engagement respectively with the legs 13 and 13', as is illustrated best in FIG. 3, so that the respective legs 13 and 13' are held closely to each other. The elements 11 and 12 are prevented from coming apart as long as the fingers 22 and 22' engage with the selected slots.

At the same time that the elements 11 and 12 are moved longitudinally with respect to each other to position the fingers in overlapping engagement with the leg portions 13 and 13', the detent 38 is also being moved along the inside surface of leg 13' toward one of position-defining apertures 28 which is associated with the particular slot pair being selected, and its corresponding length adjustment. All the apertures 28 are somewhat larger in cross-section than that of detent 38, and are positioned with respect to their respective associated slot pairs so that the detent 38, urged by the bias of member 35, automatically moves into engagement with the aperture when its associated slot pair, and the length adjustment corresponding to it, is selected and the finger of one elongated element has been moved well over the leg of the other elongated element.

Once the detent is in place within the selected position-defining aperture, the members 11 and 12 are not only in positively fastened together relationship, but also locked therein, since relative longitudinal movement of the members cannot take place. The member 10 is thus selectably adjusted to any one of the plurality of lengths, and the result is a rigid member whose length is held indefinitely until the locking member is released by withdrawing detent 38 from the selected aperture by pulling portion 42, whereupon the adjustment operation may be repeated and a new length, or even the same length selected.

The above described construction is not the only one which may be used to effectuate the principles of the invention and a modified structure is shown in FIG. 4. In view of the similarities between these embodiments, reference numerals in the 100 series have been used in FIG. 4 to designate those elements which correspond to similar elements in FIGS. 1–3. The structure of FIG. 4 is generally similar to that of FIG. 3, except for the positioning of the fingers and the slots, and the construction of the details of the locking member. Again, elements 111 and 112 are positioned with the legs 113, 114, 113' and 114' in face abutting interlocking engagement. However, in this case fingers 44 and 44', of generally similar configuration and dimensions as fingers 22 and 22' of the previously described embodiment, are both formed integrally with leg 113, of element 111. A plurality of pairs of slots, such as slots 47 and 48, of generally similar configuration and construction as slots 18 through 20 above, are formed in leg 113' of member 112, with the longitudinal spacing between slots equal to that between fingers 44 and 44'. Although these fingers are similar to fingers 22 and 22', it should be noted that they extend longitudinally in the same direction, while the fingers 22 and 22' extend in opposite directions. A plurality of slot pairs are provided in leg 113', each pair corresponding to a selectable position. Two slots need not be provided for each pair, and closely adjacent positions of adjustment may have a common slot.

Also provided is an elongated, thin, generally flat resilient locking member 135 similar to that of the previously described figures attached at one end by fastener 136 so as to extend longitudinally in a position comparable to member 35 above. However, the member 135 differs in that, instead of having an integral detent and manually graspable portion, it carries a pin 50 which provides these functions. The pin 50 is received in an opening in member 135 and includes an annular shoulder 54 adjacent one end thereof. Pin 50 further includes a portion 51 outwardly of shoulder 54, which normally protrudes into and beyond leg 113 through an access opening therein, which portion replaces detent 38 in the previous figures. Pin 50 still further includes a portion 52 extending in the opposite direction from shoulder 54, and which replaces manually graspable portion 42 in the previous figures. Member 135 bears against shoulder 54 (it may be secured thereto as by welding) to bias pin portion 51 outwardly through the access opening in leg 113, and into engagement with a position-defining aperture 55 located between the slots of the selected slot pair, it being understood that a position-defining aperture is provided for each such slot pair.

Assembly of the elements is carried out in a manner similar to that described above, with elements 111 and 112 being moved lengthwise with respect to each other once the fingers have been inserted in the corresponding slots, so that the fingers 44 and 44' embrace leg 113'. At the same time, the detent portion 51 of pin 50 moves into engagement with the position defining aperture associated with the selected slot pair.

What is claimed is:

1. An adjustable elongated bed frame member adapted to be fastened transversely between a pair of horizontally disposed further bed frame members so as to hold said further bed frame members in spaced parallel relationship, said adjustable member comprising: a first elongate L-shaped element adapted at one end to be fastened to one of said pair of further bed frame members and comprised of first and second mutually perpendicular flat legs, said first leg being provided with a first finger protruding therefrom at the end opposite said adapted end, said finger having a first generally transversely extending portion and a second elongated portion spaced from said first leg and extending generally parallel to said first leg, said first leg also including a plurality of longitudinally spaced and longitudinally elongated slots; a second elongate L-shaped element adapted at one end to be fastened to the other of said pair of further frame members and comprised of first and second mutually perpendicular flat legs, said first leg being provided with a second finger protruding therefrom at the end opposite said adapted end, said second finger having a first generally transversely extending portion extending a direction opposite to that of said first portion of said first finger and a second elongated portion spaced from said first leg and extending generally parallel to the first leg of said second element, said second element also including a plurality of longitudinally spaced and longitudinally elongated slots that are spaced from each other and from said second finger by dimensions corresponding to the spacing of the same elements of said first elongate element, said fingers being similar in transverse width to said elongated slots and somewhat smaller in longitudinal length than said elongated slots, each of said fingers being adapted for respective insertion through one of the elongated slots of the other element when like legs of said elongate elements are positioned in face abutting engagement with one another, the space between each of said elongated finger portions and their respective legs allowing said elongated finger portions to clear the adjacent leg of the other element, said elongated finger portions of each elongate element overlapping and engaging the first leg of the other elongate element when said first and second elongate elements are moved longitudinally relative to one another so that said first and second elongate elements are positively held against separation; and means for retaining said first and second elements in a selected position of adjustment and including a plurality of longitudinally spaced, position defining apertures in one of said elongate elements, with one of said position defining apertures being associated with each slot on said one elongate element and the complementary slot on the other elongate element, said retaining means further including a releasable locking member at a fixed location on the other of said elongate elements, said other elongate element being provided with a single lock access aperture at said fixed location, said locking member being a thin, flat elongated, inherently resilient member connected at one end to said other elongate element and passing over said access aperture, said resilient member having a detent at said access aperture adapted to pass therethrough and engage within one of said position defining apertures, said resilient member also having a manually graspable portion for withdrawing the member against its resilient bias, said access aperture being spaced from the selected one of said position defining apertures when said fingers are initially inserted in said slots associated with the selected position defining aperture, and said access aperture being positioned in registry with the selected position defining aperture when said elongate elements are moved longitudinally relative to one another to cause said fingers to engage a leg of the other elongate element, whereby said detent is moved into engagement with the selected position defining aperture to lock said first and second elongate elements in said positively held together relationship position of adjustment until said locking member is released by withdrawing said detent from the selected position defining aperture.

2. A bed frame member as set forth in claim 1 wherein said first legs are vertically disposed and said second legs are horizontally disposed.

3. A bed frame member as set forth in claim 1 wherein said fingers are integral with their respective legs.

4. A bed frame member as set forth in claim 1 wherein the detent and manually graspable portion of said locking member are formed integrally therewith.

5. A bed frame member as set forth in claim 4 wherein said detent portion is provided by an outwardly bent section having a rounded end portion.

6. A bed frame member as set forth in claim 5 wherein the manually graspable portion is provided by a further section which is bent outwardly in a direction opposite to said detent portion.

7. An adjustable elongated bed frame member adapted to be fastened transversely between a pair of horizontally disposed further bed frame members so as to hold said further bed frame members in spaced parallel relationship, said adjustable member comprising: a first elongate L-shaped element adapted at one end to be fastened to one of said pair of further bed frame members and comprised of first and second mutually perpendicular flat legs; a second elongate L-shaped element adapted at one end to be fastened to the other of said pair of further frame members and comprised of first and second mutually perpendicular flat legs; first and second fingers associated with the first leg of at least one of said elongate elements, said fingers each having a first generally transversely extending portion and a second elongated portion spaced from the first leg with which said fingers are associated; a plurality of longitudinally spaced and longitudinally elongated slots associated with the first leg of at least one of said elongate elements, said slots being spaced so as to correspond to a plurality of selectable positions, said slots having a transverse width similar to the transverse width of said fingers and a lengthwise dimension which permits said elements to be positioned with the first and second legs thereof in face abutting engagement and with each finger received within one of said slots, the elongate portion of said fingers being spaced from the legs with which the fingers are associated by a dimension at least as great as the thickness of the leg having the slots therein so that upon lengthwise movement of the elongate elements, the elongate finger portions embrace the leg portions adjacent the slots therein; and means for retaining said first and second elements in a selected position of adjustment and including a plurality of longitudinally spaced, position defining apertures in one of said elongate elements, said retaining means further including a releasable locking member at a fixed location on the other of said elongate elements, said other elongate element being provided with a single lock access aperture at said fixed location, said locking member being a thin, flat, elongated, inherently resilient member connected at one end to said other elongate element and passing over said access aperture, said resilient member having a detent at said access aperture adapted to pass therethrough and engage within one of said position defining apertures, said resilient member also having a manually graspable portion for withdrawing the member against its resilient bias, said access aperture being spaced from the selected one of said position defining apertures when said fingers are initially inserted in said slots, and said access aperture being positioned in registry with the selected position defining aperture when said elongate elements are moved longitudinally relative to one another to cause said fingers to move into said aforementioned leg embracing relationship, whereby said detent is moved into engagement with the selected position defining aperture to lock said first and second elongate elements in positively held together relationship position of adjustment until said locking member is released by withdrawing said detent from the selected position defining aperture.

8. A bed frame member as set forth in claim 7 wherein said first and second fingers are both provided on the first leg on said other elongate element, with the elongated portions of said first and second fingers extending in the same direction, said slots all being provided on said one elongate element and spaced from one another by a dimension corresponding to the spacing between said fingers.

9. A bed frame member as set forth in claim 7 wherein said locking member is secured to the side of the first leg of said other elongate opposite from said fingers.

10. A bed frame member as set forth in claim 9 wherein the detent of said locking member is provided by one end of a pin that is located at the end of said locking member remote from its connection to said other elongate element, with the opposite end of said pin providing said manually graspable portion.

*11. In a bedframe having side rails, interconnected by end crossbars respectively having a pair of sections manually releasably interconnectable in nested relation at a plurality of selectable positions to provide a plurality of standard bed widths, comprising: connecting means on one of the sections of each end crossbar operable to engage a portion of the other section of the end crossbar at each selectable bed width position, and at the selected bed width position to anchor the connected sections against axial relative movement; and manually releasable latch means carried by one of said sections including a unitary spring clip for retaining the sections in connected nested relation at the selected bed width, said nested crossbar sections including flat surfaces parallel to one another, said spring clip being mounted on one of said flat surfaces, and said spring clip including a flat portion parallel to its respective flat surface and mounted for movement with respect thereto.*

*12. The bed frame according to claim 11 wherein at least a portion of the connecting means is associated with said spring clip, said portion of said connecting means being a projection extending from said spring clip.*

*13. The bed frame according to claim 11 wherein said nested crossbar sections are L-shaped members, each L-shaped member consisting only of mutually perpendicular flat legs.*

*14. The bed frame according to claim 11 wherein said spring clip is an inherently resilient member.*

* * * * *